United States Patent Office 3,283,686
Patented Nov. 8, 1966

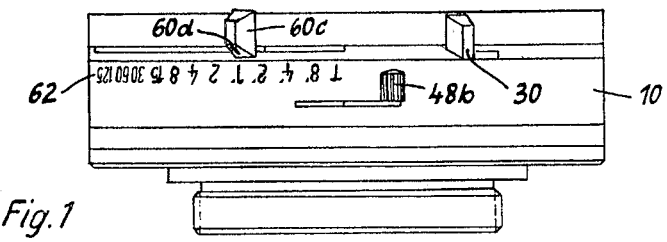
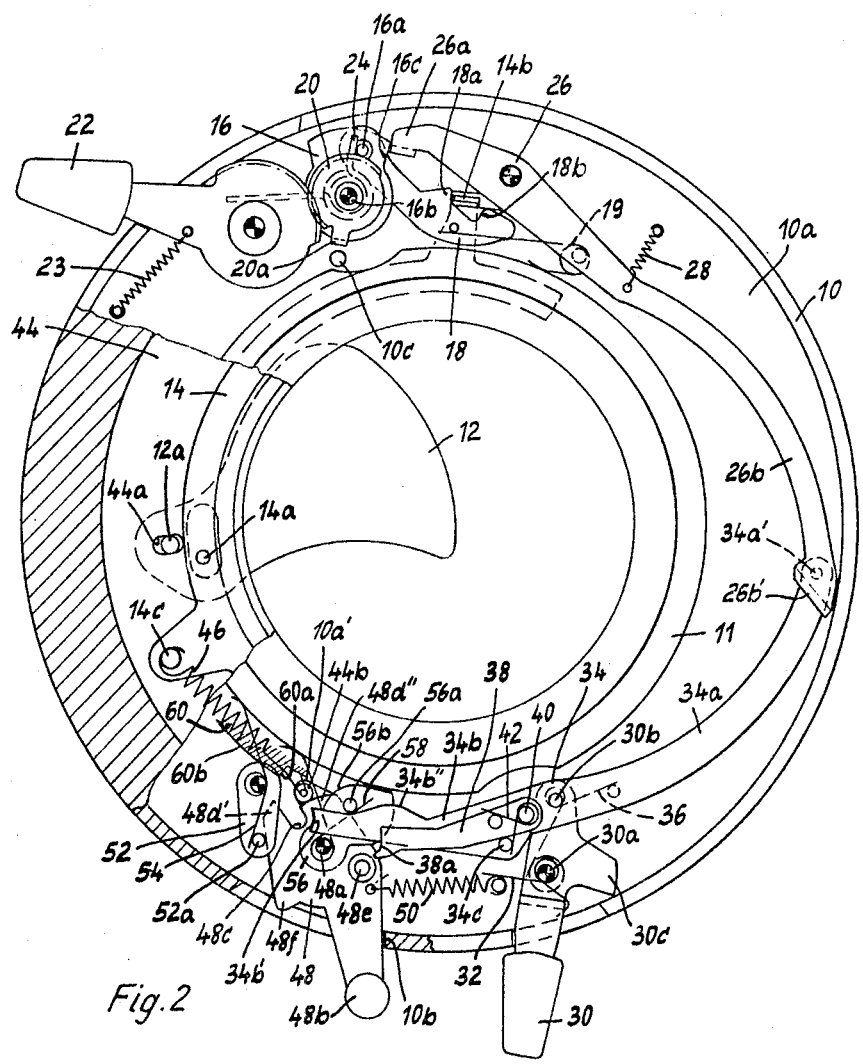

3,283,686
PHOTOGRAPHIC SHUTTER
Franz Singer and Herbert Benninger, Munich, Germany, assignors to Compur-Werk G.m.b.H. & Co., Munich, Germany, a company of Germany
Filed Apr. 7, 1964, Ser. No. 357,896
Claims priority, application Germany, Apr. 26, 1963, C 29,776
7 Claims. (Cl. 95—63)

The present invention relates to a photographic shutter having a tensionable main driving member which actuates the shutter blades to make an exposure, more particularly, to the relationship between the mechanism for releasing the main driving member for the running down movement and an arrangement for opening and closing the shutter blades to permit an interim inspection of the subject to be photographed (for example, to adjust the settings of the photographic apparatus) without disturbing the shutter setting.

One form of a photographic shutter comprises not only a release mechanism to actuate the shutter blades to make an exposure but, in addition, an operating handle which actuates a mechanism to open and close the shutter blades to permit an interim inspection. Difficulties have been encountered when the operator neglects to operate the operating handle and the shutter mechanism in the proper sequence after an interim inspection. In rare cases different sequences of operation are required when the shutter is set to instantaneous exposure and to T-exposure. Thus, any carelessness on the part of the operator at the conclusion of the interim inspection may result in faulty operation of the shutter release mechanism.

It is therefore the principal object of the present invention to provide a simple yet effective arrangement to prevent faulty operation of the operating handle to initiate and conclude the interim inspection and to make operation of the shutter mechanism virtually fool-proof under all exposure settings and operating conditions.

The object of the present invention is achieved by providing a driver lever on the shutter release mechanism and a control lever operative during a T-setting on the opening mechanism wherein upon actuation of the shutter release mechanism the driver lever is guided by the control lever to actuate the closed opening mechanism into position wherein the blades are open.

This invention also provides an uncoupler associated with the shutter release mechanism and a control lever operative when the blades are in the open position associated with the opening mechanism in such a manner that upon actuation of the release mechanism, the uncoupler is guided by the control lever to unlock the opening mechanism from the open position before actuating the shutter blade mechanism.

With this invention the operator can initiate the interim inspection when the shutter is set for instantaneous exposure by a first actuation of the opening mechanism. The interim inspection can be concluded either by a second actuation of the opening mechanism of by actuating the shutter release mechanism.

Similarly when the shutter is set to T-exposure, opening and closing of the shutter blades can be achieved either by twice actuating the shutter release mechanism or the opening mechanism or by alternately actuating the shutter mechanism and the opening mechanism.

Other objects and advantages of the present invention will be apparent upon consideration of the accompanying specification in conjunction with the following drawings wherein:

FIG. 1 is an elevational view illustrating the shutter housing,

FIG. 2 is a plan view of the shutter, on an enlarged scale, with the front plate omitted, and, FIGS. 3 to 6 are views of the shutter similar to FIG. 2, but showing the shutter in different operating positions.

Figure 3:
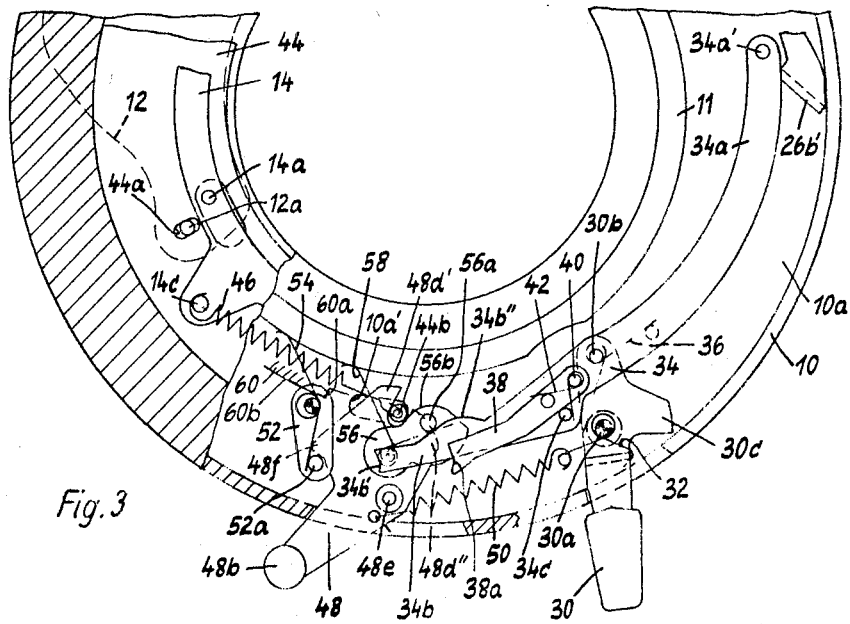

The shutter illustrated in FIGS. 1 to 6 is a sector shutter of the kind known per se, the mechanisms of which are mounted in a shutter housing 10. It comprises, for example, five shutter blades 12, only one of which is shown for simplicity. Each blade has a pin 12a and is actuated by a driving pin 14a of a blade-operating ring 14 in a to and fro movement for the purpose of opening and closing the lens aperture. The blade-operating ring is driven by a main driving member 16 and a link 18 which is pivotally conected to this member and which cooperates with the upwardly bent end of an arm 14b of the blade-operating ring 14.

Mounted for free rotation on a pin 16b and coaxially above the main driving member 16 is a cocking pinion 20 which is engaged with a sector gear on a cocking lever 22. A return spring 23 acts to return the cocking lever 22 and the cocking pinion 20 to their initial positions after each cocking operation. The cocking pinion 20 has a rearwardly bent lug 20a which cooperates with an upwardly projecting driving pin 16a of the main driving member. Furthermore, the main driving member 16 is set or cocked by an operating spring 24 which urges the member in the clockwise direction. In the cocked position shown in FIG. 2, the main driving member is held by an arm 26a of a double-armed locking lever 26, the other arm 26b of this lever having a rearwardly bent lug 26b' which is loosely engaged with a transfer lever 34. A spring 28 acts to move the locking lever 26 in the counterclockwise direction and to press its arm 26b against the inner wall of the shutter housing.

A release lever 30 is pivotally mounted on a fixed pin 30a and a torsion spring 32 biases the lever 30 in the clockwise direction. A double-armed transfer lever 34 is mounted on a pin 30b on the release lever 30 and has a first arm indicated at 34a and a second arm at 34b. The first arm has a pin 34a' which is releasable engaged with the lug 26b' of the locking lever 26. The second arm has a concave surface 34b' and a cam surface 34b''. A torsion spring 36 which is associated with the transfer lever 34 and is wound around the pin 30b, urges the lever in the clockwise direction. Bearing against the transfer lever 34 through a bearing pin 40 is a driver 38 which is urged by a spring 42 in the counter-clockwise direction and is pressed against a pin 34c on the transfer lever 34. The freely movable end of the driver 38 is in the form of a claw 38a.

To enable the shutter to be opened for interim inspection during range setting, there is provided adjacent the blade operating ring 14 which moves the blades 12 during an exposure, a further ring 44 having a plurality of control slots 44a which receive the pins 12a of the blades 12. The ring 44 will accordingly be referred to as a blade bearing ring in the follow description. By moving the blade bearing ring 44 in the counter-clockwise direction, the blades 12 can be pivoted about the driving pins 14a to open the light aperture for the purpose of interim inspection, and they are closed again on return of the said ring in the clockwise direction.

The blade bearing ring 44 has a pin 44b which projects forwardly through a limiting slot 10a' of the base plate 10a. A spring 46 has one end attached to the pin 44b of the blade bearing ring 44 and its other end to a pin 14c on the blade operating ring 14, the two rings 14 and 44 being, therefore, positively connected together. Moreover, the spring 46 strives to hold the blade operating ring 14 as well as the blade bearing ring 44 in their rest positions.

A double-armed opening lever 48 is pivotably mounted at 48a on the base plate 10a and is provided with a handle 48b which projects from the shutter housing. A return spring 50 acts to maintain the opening lever in its rest position which is attained when its handle 48b is bearing against an edge 10b of the shutter housing 10. The opening lever has, at the zone lying inside the shutter, a driving slot 48c which is formed by two radial driving arms 48d' and 48d". The arm 48d" is so formed that, in the rest position shown in FIG. 2, it lies in front of the pin 44b of the blade bearing ring 44 and prevents movement of the latter.

In addition, the opening lever 48 has a pin 48e and a catch cam 48f which, when the opening lever is in a specific position, comes into engagement with a catch pin 52a of a catch 52 which is rotatably mounted on the base plate. A spring 54 urges the pin 52a of the catch 52 in the counterclockwise direction and against the periphery of the opening lever 48. Rotatably mounted above and coaxial with the opening lever 48 is a control lever 56 having a control pin 56a and a control surface 56b. A torsion spring 58 urges this lever 56 in the counter-clockwise direction and strives to hold it against the outer wall of the front lens tube 11. The control pin 56a cooperates with the cam surface 34b" of the transfer lever 34.

Rotatably mounted on the front lens tube 11 of the shutter is a time control ring 60 which has a stepped portion 60a, a radial T-control surface 60b, and an operating handle 60c which projects from the shutter housing and is provided with an indicator mark 60d which is movable over a fixed time scale 62.

The method of operation of the shutter as described above is as follows:

The shutter is set to an exposure time of 1 second, as shown in FIGS. 1 to 4, and is cocked. If the operator desires to take a photograph, he must move the release lever 30 in the counter-clockwise direction against the action of the torsion spring 32. As a result of this turning movement, the transfer lever 34 together with the driver 38, is moved to the left, the cam surface 34b" of its arm 34b sliding over the control pin 56a of the control lever 56 and thereby moving the arm 34b and the driver 38 freely past the catch pin 52a and the pin 48e respectively. The other arm 34a of the transfer lever 34 has moved the locking lever 26 with it in the clockwise direction through its pin 34', so that the main driving member 16 is liberated for run down. Under the effect of the operating spring 24, this member 16 runs down in the clockwise direction towards its rest position which is determined by a fixed striking pin 10c engaged by a nose 16c on the main driving member.

During this rundown movement of the main driving member 16, the link 18 is first moved to the right, whereby its coupling cheek 18a moves the arm 14b of the blade operating ring in the clockwise direction to open the shutter blades 12. In the second phase of this rundown movement of the main driving member the link 18 is moved to the left whereby its other coupling cheek 18b moves the arm 14b of the blade operating ring 14 in the anti-clockwise direction back to its rest position to close the blades. To obtain different exposure times—in the present example of embodiment from 8 sec. to $\frac{1}{250}$ sec.—there is associated with the main driving member a retarding mechanism (not shown). After liberation of the release lever 30, the latter, together with the transfer lever 34 and the locking lever 26, returns to its initial position shown in FIG. 2 under the action of the return springs 32, 28.

The shutter is recocked by moving the cocking lever 22 in the clockwise direction so that the cocking pinion 20 which is connected to the lever 22, is moved in the counter-clockwise direction. After a short free movement, the lug 20a of the cocking pinion 20 comes into contact with the driving pin 16a of the main driving member 16 so that the latter is moved in the same direction and into the cocking position. In this position, it is held by the arm 26a of the locking lever 26, while—as already described—the cocking lever 22 and the cocking pinion 20 return, after the cocking operation, to their initial positions under the action of the return spring 23. As the coupling cheek 18a is out of engagement with and in front of the arm 14b when in the rest position, a rightward adjustment of the link 18 during the first phase of the cocking movement does not influence the arm 14b of the blade operating ring 14. In fact, the coupling cheek 18a slides over the inner surface of the arm 14b facing the center of the shutter, under the action of a spring 19. During the second phase of the cocking movement the link 18 is moved to the left until it again assumes the position shown in FIG. 2.

Now if the shutter is to be opened for interim inspection at the same time setting as in FIGS. 1 to 4, the opening lever 48 is turned by hand out of the position of FIG. 2 into that illustrated in FIG. 3. In the first phase of this movement of the opening lever 48 its arm 48d" first releases the pin 44b. Shortly thereafter the arm 48d' comes to bear against the pin 44b and moves the latter with it so that the blade bearing ring 44 is now moved in the anti-clockwise direction. During the further movement of the members 48, 44 the pin 44b enters the driving slot 48c and is moved by the opening lever 48 until it rests on the other end of the limiting slot 10a', so that the shutter is opened.

Shortly before the end of this phase of the movement the pin 44b comes into engagement with the control surface 56b of the control lever 56 and turns the latter in the clockwise direction, with the result that the transfer lever 34, together with the driver 38, is moved through the control pin 56a in the counter-clockwise direction about the pin 30b. Thus, the pin 34a' of the transfer lever and the lug 26b' of the locking lever 26 are disengaged. In the operative position of the shutter shown in FIG. 3 the blades 12 are now completely open for interim inspection and the shutter remains held in this open position, the catch pin 52a of the catch 52 coming into engagement with the catch cam 48f of the opening lever.

As soon as the interim inspection has terminated and the shutter is to be closed again, there are two possible ways of achieving this:

(a) A small pressure exerted in the anit-clockwise direction of the handle 48b of the opening lever 48 is sufficient to release the locking engagement between the catch cam 48f and the catch pin 52a. The opening lever 48 and the blade bearing ring 44 thereupon return to the rest position shown in FIG. 2 under the action of the return springs 50, 46 whereby the shutter is closed and the blade bearing ring is held against undesirable movement in the manner already described. The control lever 56 has in the meantime taken up its initial position of FIG. 2 under the action of its spring 58. This movement is followed by the transfer lever 34 in the clockwise direction under the action of its spring 36, so that the pin 34a' of the transfer lever 34 and the lug 26b' of the locking lever 26 are re-engaged. Release of the shutter for an exposure can now be effected by actuating the release lever 30.

(b) If the release lever 30 is actuated instead of the opening lever 48 and is moved in the counter-clockwise direction, the transfer lever 34 moves to the left, its cam surface 34b" running over the control pin 56a so that the concave surface 34b' comes into engagement with the catch pin 52a and the locking engagement between the catch cam 48f and the catch pin 52a is released, the opening lever 48 which takes up the position shown in FIG. 3, being liberated and returning to its rest position shown in FIG. 2 under the action of its spring 50. The shutter is thus closed. In addition, the control lever 56 reassumes its rest position so that, when the members 30, 34 return under the action of the spring 32, the transfer lever 34 and the locking lever 26 are re-engaged. (See FIG. 2.)

Release of the shutter for an exposure can now be performed by actuating the release lever 30 once more.

Figure 5:
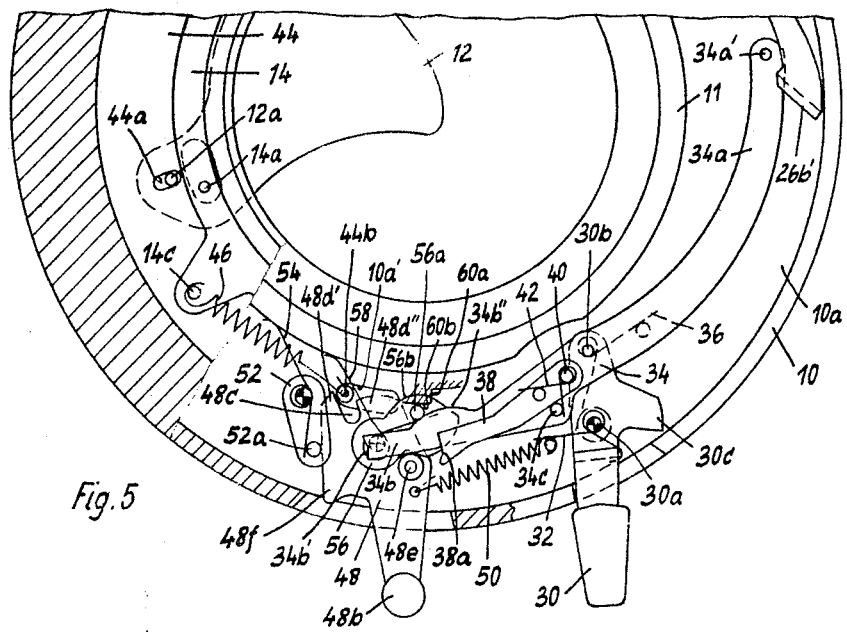

If the operator wishes to take a photograph which requires an exposure time of over 8 seconds, the main drive 16, 18 and so on can no longer be used. In fact, in the case of an exposure time of such a length, the exposure is effected by the T-device of the shutter. To this end, the time control ring 60 is turned until its indicator mark 60d is opposite the T-index. As a result of this turning movement its stepped portion 60a comes into engagement with the control pin 56a whereby, on further turning of the time control ring 60, the control lever 56 is pivoted in the clockwise direction until its control pin 56a slides off the stepped portion 60a and on to the control surface 60b (FIG. 5). The result of this change is that the control pin of the stop mechanism (not shown) is brought out of operation. During the aforesaid pivoting movement of the control lever 56, the opening lever 48 is raised by a small amount in the clockwise direction by its pin 48e. At the same time the control pin 56a causes a turning movement in the counter-clockwise direction of the transfer lever 34 about the pin 30b so that the transfer lever 34 and the locking lever 26 are disengaged.

In the T-position shown in FIG. 5 the cam 60a of the time control ring 60 engages the pin 56a of the control lever 56, whereby said control lever 56 is moved in a clockwise direction and its pin 56a engages the cam surface 34b″ of the lever 34. Therefore, the main drive 16, 18 is disconnected by uncoupling of the members 34, 26 as described in detail above, so that the shutter must be manually opened for the purpose of interim inspection as well as for an exposure, and closed.

If an interim inspection is to be performed before an exposure, opening of the shutter in the T-position is performed in the following different ways—irrespective of whether the shutter is cocked or is uncocked:

(aa) Either by turning the opening lever 48 in the clockwise direction as mentioned above in connection with FIGS. 2 to 4.

Figure 6:
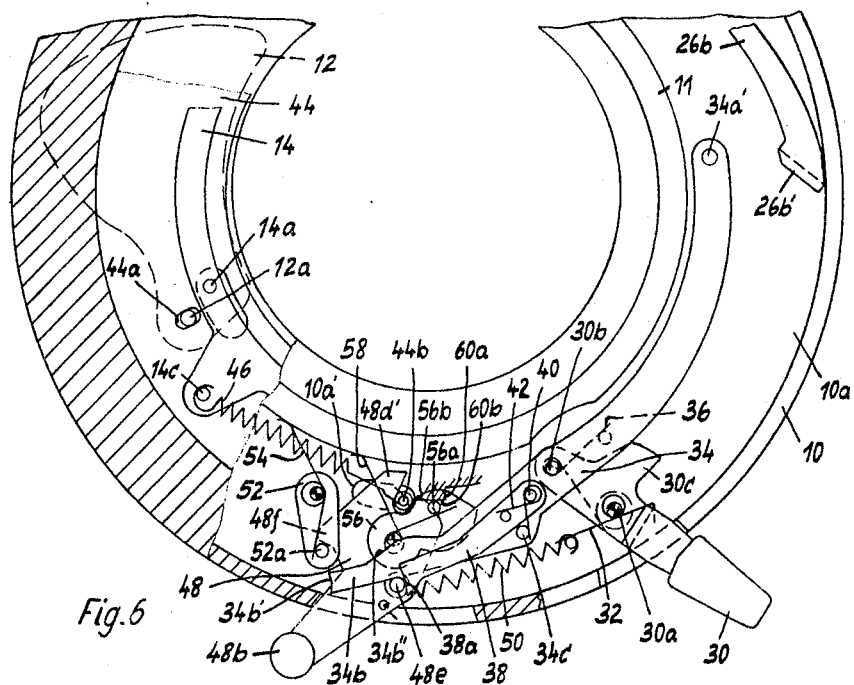

(bb) Or by turning the release lever 30 in the counter-clockwise direction so that the transfer lever 34 is moved to the left whereby its cam surface 34b″ slides over the control pin 56a with the result that the claw 38a of the driver 38 can engage the pin 48e of the opening lever 48 and move it into the interim inspection position shown in FIG. 6. The opening lever 48 is held in this position by the catch device 48f, 52a described in detail above. By virtue of the engagement between the claw 38a and the pin 48e, in this pushing movement of the transfer lever 34, the cam surface 34b″ is lifted off the control pin 56a since the members 34, 38 are, in fact, connected together by the spring 42. At the same time the transfer lever 34 is so positioned that it freely passes by the catch 52 (FIG. 6). After liberation of the release lever 30 the members, 30, 34, 38, are returned to their initial positions shown in FIG. 5 by the return spring 32.

Figure 4:
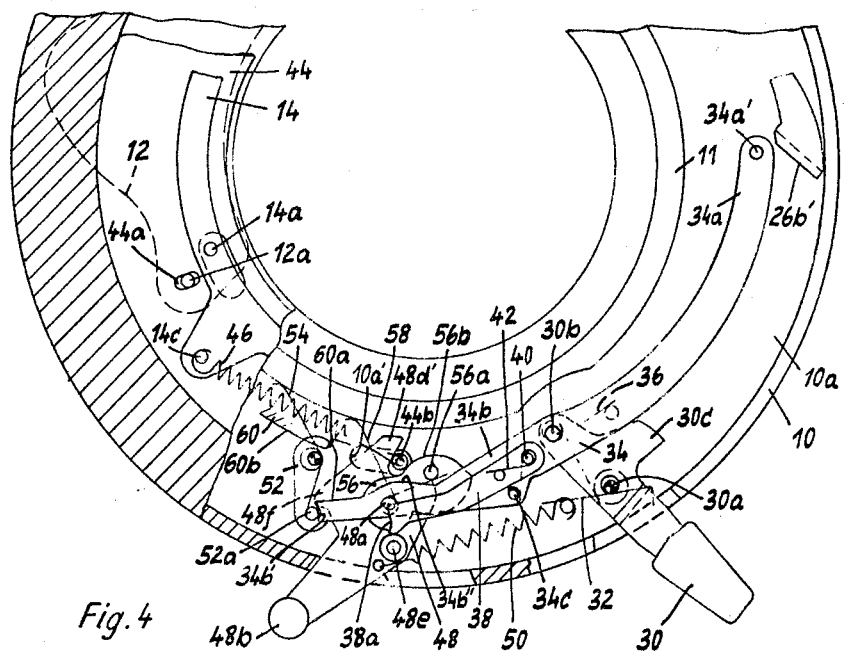

Closing of the shutter which has been opened in T-setting for interim inspection, can be accomplished by actuating either the opening lever 48 or the release device 30, the movements being, in any event, the same, as described in connection with FIGS. 2 to 4.

Opening and closing of the shutter for the exposure after the interim inspection is effected in the same way as in T-adjustment for interim inspection, the period for which it is held open being determined by auxiliary means, e.g., a clock.

If a further exposure is to be taken later, the exposure operations again being controlled by the main drive mechanisms 16, 18 it is necessary to turn the time control ring 60 back in the clockwise direction until its indicator mark 60d is opposite the exposure time setting on the scale 62. Thus, the control member 56 can reassume its position shown in FIG. 2 under the action of its spring 58 so that the lever 34 and the locking lever 26 are reengaged. The opening lever 48 has also reassumed its initial position (FIG. 2).

To provide for self-portraits or remote control, a cable release is screwed into a screw-threaded nipple (not shown) in the shutter housing in such a way that it cooperates with a rearwardly cranked arm 30c of the release lever 30.

It should be mentioned that the setting springs 32, 50 associated with the operating handles 30, 48 are very weak so that the handles can be actuated with only a small expenditure of effort.

The use of the above described features of the invention has the advantage that operation of the opening and release handles is fool-proof. Possible faulty operation or dislocation of the handles 30, 48b as a result of carelessness, cannot lead to faulty exposures.

It is apparent that various modifications and alterations are possible in light of the foregoing teachings. What is claimed as new and desired to be secured by Letters Patent is:

We claim:

1. A photographic shutter comprising a plurality of pivotally mounted shutter blades, means including a tensionable main driving member for moving said shutter blades to the open and closed positions to make an exposure, means operatively connected to said blade moving means for releasing said main driving member from its tensioned position into running down movement to actuate said blade moving means during an exposure, said releasing means including a disengageable transfer lever whereby disengagement of said transfer lever disconnects said releasing means from said blade moving means, opening means operatively connected to said shutter blades for opening and closing said shutter blades for an interim inspection, a releasable catch engaging said opening means when said opening means are in the open position to lock said shutter blades in the open position, said releasable catch being engageable by said transfer lever when said transfer lever is in the disengaged position, and a pivotally mounted control member operatively connected to said opening means and disengaging said transfer lever when said opening means is in the open position whereby actuation of said releasing means will move said disengaged transfer lever to release said catch to return said opening means to the closed position without releasing said main driving member from its tensioned position.

2. A photographic shutter as claimed in claim 1 wherein said transfer lever is pivotally mounted on said releasing means and has first and second arms, spring means urging said first arm of said transfer lever into engagement to maintain said releasing means drivingly connected to said blade moving means so that actuation of said releasing means will release said main driving member from its tensioned position, said second arm of said transfer lever having a cam surface engageable with a control pin on said control lever.

3. A photographic shutter as claimed in claim 2 and further comprising a spring-biased driver lever pivotally mounted on said transfer lever second arm, said driver lever being engageable with a pin on said opening means to open said blades.

4. A photographic shutter as claimed in claim 2 and further comprising an exposure time setting ring including a T-setting, said blade moving means also including a blade ring operatively connected to said shutter blades so that rotation of said blade ring pivots said shutter blades, a pin on said blade ring, said opening means comprising an opening lever pivotally mounted on a fixed pivot, said opening lever having a first arm projecting from the shutter housing and manually manipulatable and a second arm within said shutter housing, said second arm having a fork in the end thereof and said fork engaging said blade ring pin upon movement of said opening lever to move said blade ring and the shutter blades connected thereto to the open position, said control lever having a control pin thereon engageable by said exposure time setting ring when in the T-setting position so that the control lever is moved into a position to disengage said transfer lever, an edge of said control lever being engageable by said blade ring pin when the shutter blades are in the open position also to disengage said transfer lever.

5. A photographic shutter as claimed in claim 4 wherein said opening lever has a catch cam thereon, and a spring-biased catch lever having a catch pin thereon engageable with said opening lever catch cam when said opening lever is in the open position to maintain said blades in the open position.

6. A photographic shutter as claimed in claim 5 wherein the end of said second arm of said transfer lever has a concave shape engageable with said catch pin of said catch lever to release said opening lever whereby said blades are returned to the closed position.

7. A photographic shutter comprising a plurality of shutter blades movable from a closed position to an opened position, an exposure time setting means including a T-setting, a tensionable main driving member for moving said shutter blades to the open and closed positions to make an exposure, a manually operable releasing member for releasing said main driving member from its tensioned position into running down movement to actuate said shutter blades during an exposure, at least two disengageable transfer levers arranged between said releasing member and said main driving member, a manually operable opening means operatively connected to said shutter blades for opening and closing said shutter blades for an interim inspection, spring means holding said opening means in closed position of the shutter blades, a releasable catch holding said opening means in the open position of the shutter blades, the first of said transfer levers being pivotally mounted on said releasing member and provided with first and second arms, a pivotally mounted control member alternately movable by said opening means and said time setting means, an actuating means pivoted on said releasing member and cooperating with a projection on said opening means, said control member disengaging said first transfer lever from said second transfer lever when said opening means is in the shutter blades open position, whereafter an actuation of said releasing member will move said first arm of said disengaged first transfer lever to release said catch to return said opening means to the closed position without releasing said main driving member from its tensioned position, and whereby said control member disengaging said first transfer lever from said second transfer lever when said T-setting of the time setting means is in set position whereafter an actuation of said releasing means will move said actuating means in engagement with said projection on the opening means for moving said opening means in the shutter blades open position.

References Cited by the Examiner

UNITED STATES PATENTS

| | | | |
|---|---|---|---|
| 2,344,382 | 3/1944 | Aiken | 95—63 |
| 2,527,781 | 10/1950 | Willcox | 95—63 |
| 2,926,575 | 3/1960 | Gebele | 95—42 |
| 3,075,443 | 1/1963 | Reiche | 95—42 |
| 3,081,681 | 3/1963 | Steisslinger | 95—42 |
| 3,151,537 | 10/1964 | Noack | 95—42 |
| 3,158,075 | 11/1964 | Ohara | 95—42 |

JOHN M. HORAN, *Primary Examiner.*